United States Patent [19]

Johnston, Sr.

[11] 4,228,516

[45] Oct. 14, 1980

[54] COMPUTER FOR METRIC CONVERSION

[76] Inventor: Harry L. Johnston, Sr., 4210 Belmar, Toledo, Ohio 43612

[21] Appl. No.: 972,883

[22] Filed: Dec. 26, 1978

[51] Int. Cl.³ .............................. G06J 1/00; G06F 5/00
[52] U.S. Cl. ....................................... 364/602; 235/310; 364/710
[58] Field of Search ............... 364/709, 710, 705, 706, 364/600, 602, 607, 608, 606, 852; 340/347 AD, 347 DA; 235/310

[56] References Cited

U.S. PATENT DOCUMENTS

| 3,801,803 | 4/1974 | McDaniel | 235/310 |
| 3,973,113 | 8/1976 | Goldsamt | 364/709 |
| 4,020,485 | 4/1977 | Busby | 340/347 DA |
| 4,092,523 | 5/1978 | Tava et al. | 364/710 X |
| 4,138,734 | 2/1979 | Nakata et al. | 364/710 |

*Primary Examiner*—Joseph F. Ruggiero
*Attorney, Agent, or Firm*—George R. Royer

[57] ABSTRACT

A computer adapted for metric conversions from the English system of measurement to metric, and reciprocally back to English from metric, comprising a control panel with dual window to give a simultaneous visual reading of the input and output factors, with control units to switch the conversion control system to one of a series of metric conversion media; said computer having an electronic system with conversion means from English units to metric units, and conversely metric units to English units in each of several physical measurement classifications.

1 Claim, 6 Drawing Figures

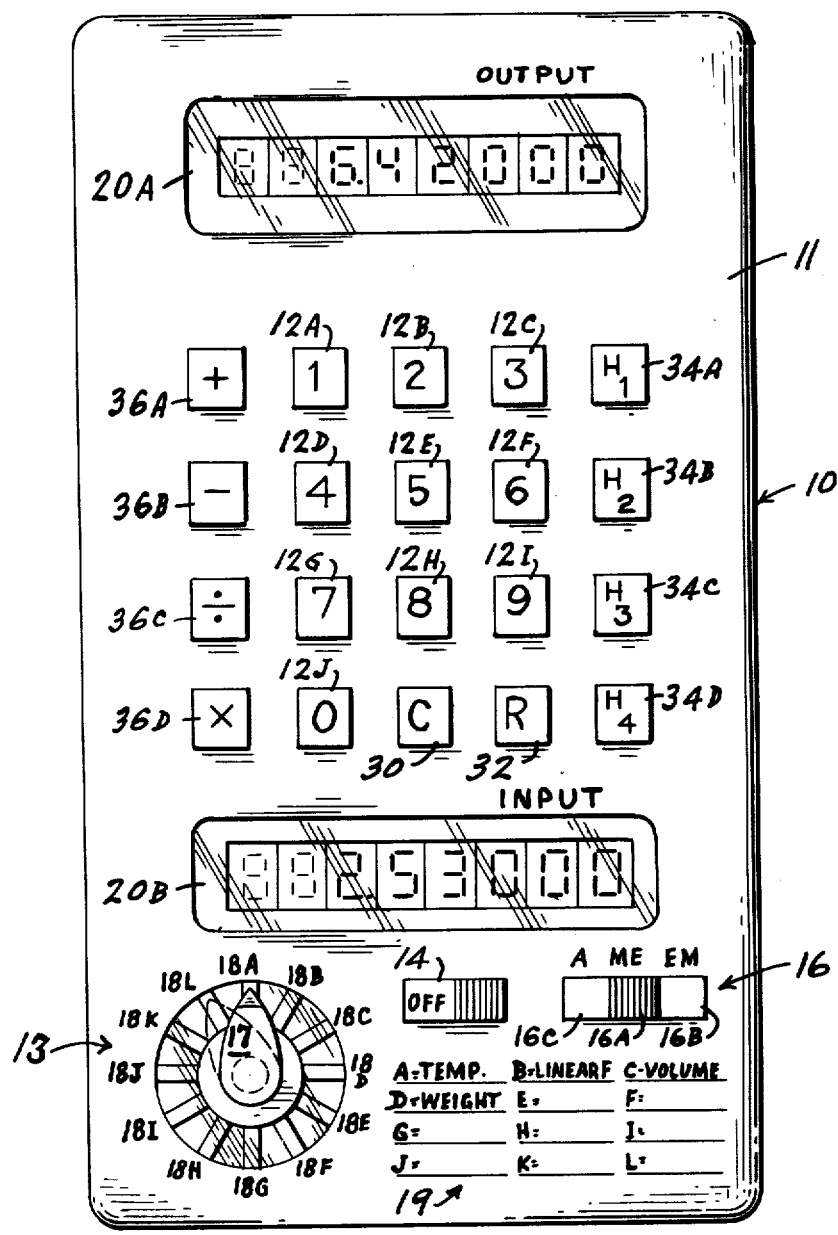
FIG-1-

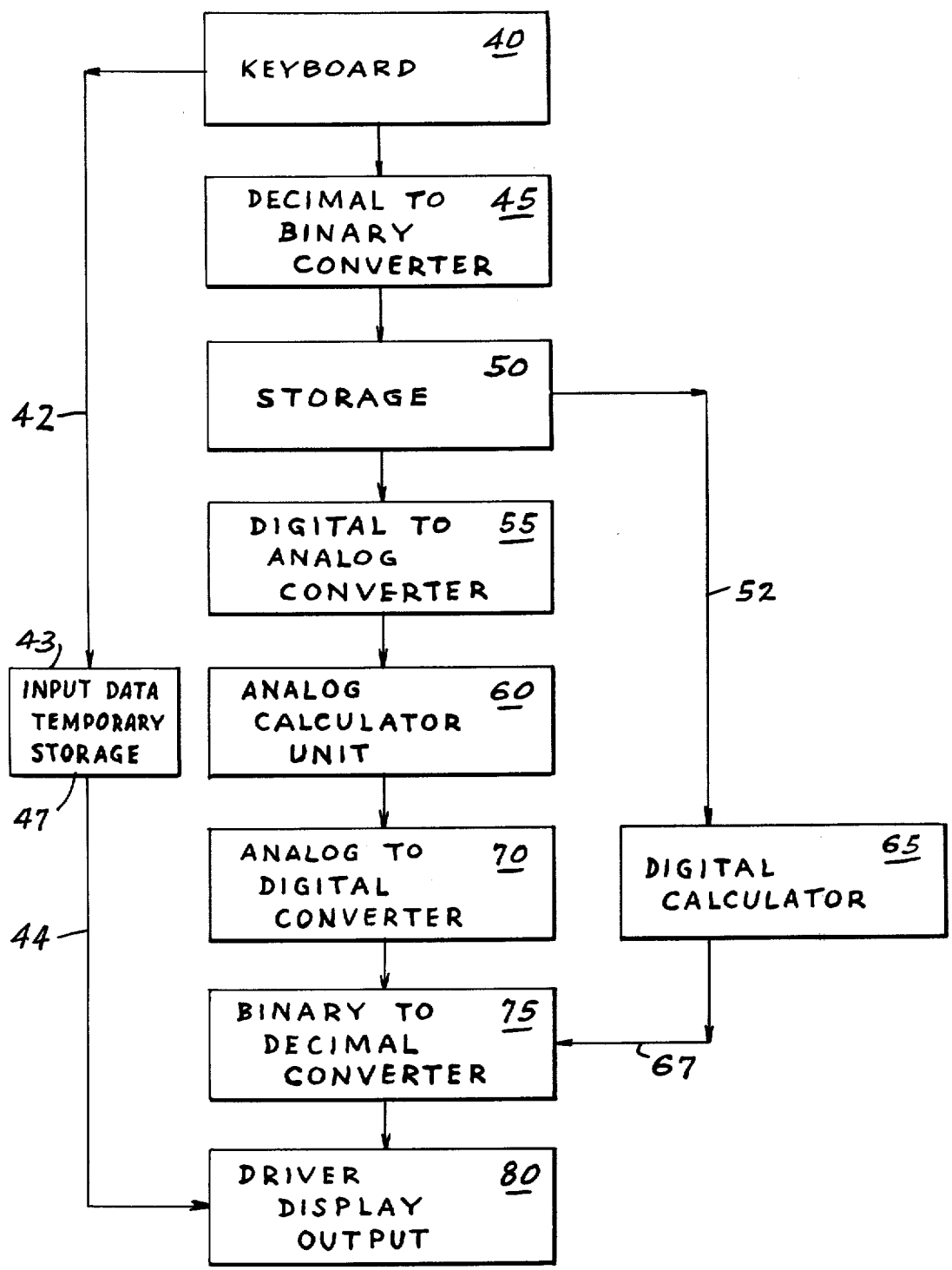
FIG-2-

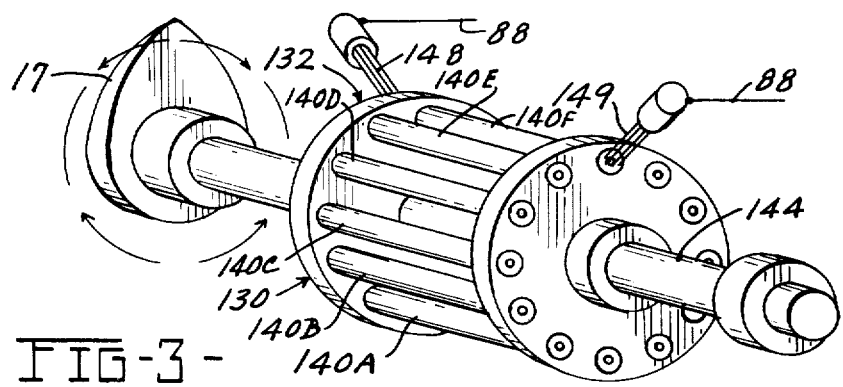
FIG-3-
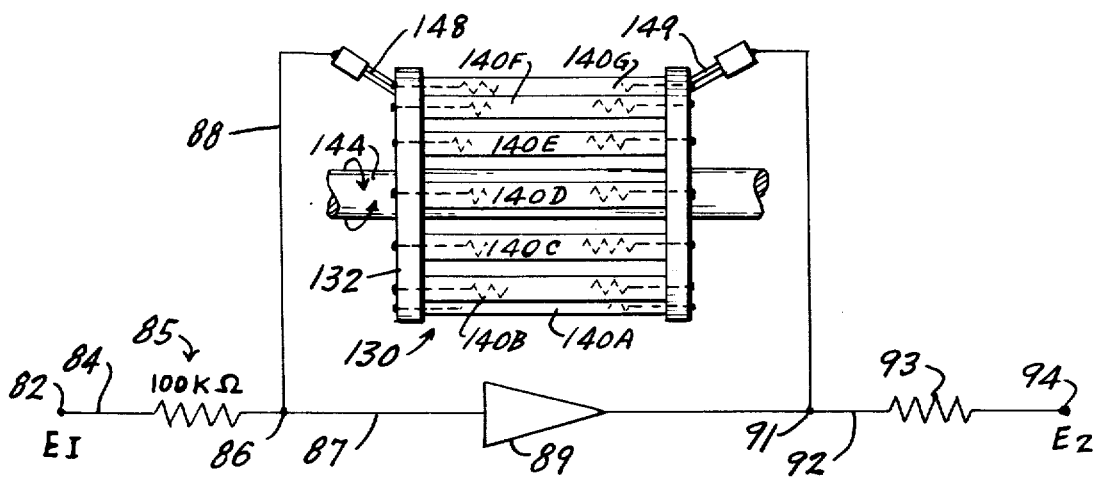
FIG-4-
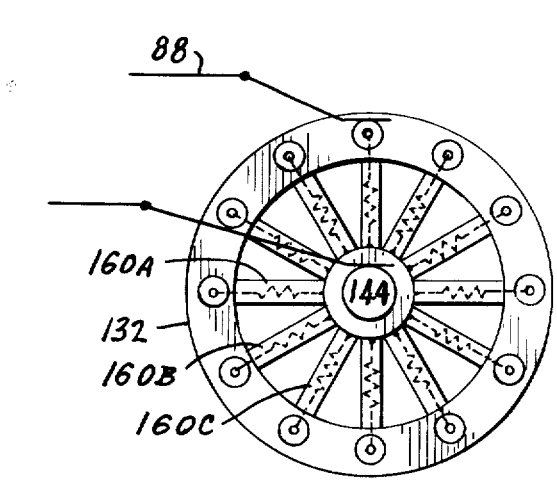
FIG-5-
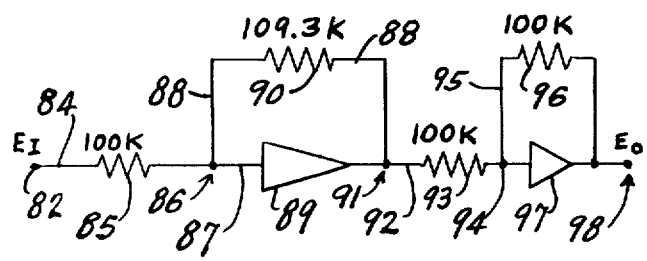
FIG-6-

COMPUTER FOR METRIC CONVERSION

DISCUSSION OF PRIOR ART

Analog and digital computers are used for various purposes, and clearly such computers, as known today, are capable of a myriad of arithmetic functions such as adding, substracting and multiplying, dividing as the case may be. The use of computers for multiplication functions is thus not new, however, only a few computers exist which are capable of converting English numerical data to metric, and vice versa for various physical measurements. Moreover, no computers exist in the art which are particularly adapted for metric conversion problems.

BACKGROUND OF THE INVENTION

It is indeed manifest that the United States, and other countries using the English system are now converting to the metric system either as a sole measuring system or a dual measuring system for physical processes. There are impending requirements in the United States that all products be metrically labeled, and this will dictate additional need for some computer aids to help in the conversion process.

It must be noted that the metric system is a uniform system of measurement throughout the world for measuring linear distances, weights, and other miscellaneous physical values. All units of surface, volume, and weight are all directly derived from the basic meter. In the metric system all units have a uniform scale of mutual interrelation based on the decimal unit, and thus, the scale of multiples and sub-divisions of the metric system is ten. Thus, for example, the decimal scale relative to linear measure is based as follows:

Ten millimeters=one centimeter;
Ten centimeters=one decimeter;
Ten decimeters=one meter;
Ten meters=one decimeter; Ten decameters=one hectometer;
Ten hectometers=one kilometer;
Ten kilometers=one myriameter;

Measure of weight and volume are similarly scaled upwardly, on this basic decimal system.

One of the problems in handling metric data is that the conversion process can be most cumbersome and as a result, much time is utilized in the process. Consequently, the use of metric measurement modes is often shunned and in the final analysis; a significant number of people will refuse to use metric measurements. In order to overcome this problem, a limited number of calculators or computers have been advanced for the purpose of facilitating metric usage. None of these existing computers are fully capable of adequately performing all metric conversion processes, with means adapted for ready visual identification of the comparative values between metric and English.

There is thus a need for a calculator which can readily convert metric units into English and in reciprocal fashion from metric to English, with simultaneous visual identification means between metric and English values for visual comparison purposes. This type of computer will enable a user to handle all measurable physical parameters in metric and English conversion modes.

Moreover, there is a need for a calculator which is capable of having the conversion factors for conversions from metric to English and vice versa integrally connected into the converter system so that the user need not resort to external sources to ascertain this conversion factor and place same in the computer. Additionally, there is a need in the prior art for a computer which can function to exclusively compute metric conversions in any given medium, and which has a readily available control mechanism to select a given metric mode for conversion purposes. This invention is directed to such ends as an improvement in the computer calculator art for metric conversion processes.

OBJECTS

In view of the foregoing it is an object of the subject invention to provide an improved calculator for metric conversion processes;

It is also an object of the subject invention to provide an electronic calculator which is directed primarily to metric conversions;

Yet another object is to provide an electrically acutated pocket calculator for conversion purposes which provides a visual screen for displaying input data as well as output data in simultaneous fashion on the computer face;

Still another object is to provide an improved calculator for metric conversion purposes;

It is an object of the subject invention to provide an improved computer and computer system for converting metric to English values, and reciprocally to convert English to metric values;

Yet another object of the subject invention is to provide an efficient computer network for conversion of variable data by various constants of multiplication;

A further object of the subject invention is to provide an improved calculator for data conversion purposes;

Other and further objects of the subject invention will become obvious from a reading of the following description taken in conjunction with the claims.

DRAWINGS

FIG. 1 is a top elevational view of the face of the computer;

FIG. 2 is a schematic block diagram of the computer system which is the subject of this invention;

FIG. 3 is a perspective view of the rotor unit comprising the main element of the analog conversion system in the subject invention;

FIG. 4 is a schematic view of the rotor unit as integrated in analog electrical system used in the conversion process in the preferred embodiment of the subject invention;

FIG. 5 is an end elevational view of the rotor device represented in FIG. 3, but with alternate features;

FIG. 6 is a schematic view of the overall electrical conversion systems in the preferred embodiment of the subject invention.

DESCRIPTION OF GENERAL EMBODIMENT

The subject invention is an electrically actuated computer for calculating conversion data from metric to English units, and conversely from English to metric units. The device is contained within a compact parallelepiped shaped housing, although this parallelepiped configuration for the housing is not considered as a critical characterization of the subject invention.

The face of the housing, considered the upper face, has control and indicator elements located thereon to operate the computer and calculator system. The computer and calculator control face comprises a key panel having thereon a plurality of control buttons corresponding to decimal units for input data. In addition, on the computer face are two visual indicator windows, one to indicate the input data reading and one to indicate the output data reading. The input data indicator window reveals the data input, as signaled by the control buttons, whether English or metric, while the output window displays the resultant calculated data, which will be metric or English depending on the conversion mode used. Moreover, the respective input and output readings are displayed concurrently to give a simultaneous visual display of English and metric data, for facility of comparison purposes for the user.

Moreover, the face of the computer also includes a conversion selector switch, which when moved from one position to next, changes the computer computational system from one mode of conversion to another. The selector switch when appropriately manipulated, rotates a rotor comprised of a plurality of parallel resistor wires thereon, each of different resistance value for effecting respectively individual analog conversion or multiplications by a constant. Each resistor unit on the rotor has a correspondingly different value which corresponds in resistance value to a conversion factor in the electrical analog system of the computer. Thus, one setting of the rotor conversion selector switch will be for linear conversion, one setting will be for volumetric conversion, another setting for liquid measure conversion, and so forth.

The computer network is a combination digital analog system with a digital to analog to digital computer network. Thus, when data is fed into the system from the keyboard, it is directed through a decimal to binary system digital converter system, of conventional structure; and thence to the digital conversion unit, which contains the rotor with the indicated multiple resistors, and from there to a binary to decimal conversion unit, and finally to the display unit.

DESCRIPTION OF PREFERRED EMBODIMENT

Referring now to the drawings in which a preferred embodiment is shown, it must be stressed that this description of the preferred embodiment is of only one specific embodiment and that other variations from this specific embodiment are possible, and the scope of the claims set forth hereinafter are not to be limited to the drawings and following description in which the preferred embodiment is shown, and particularly to FIGS. 1,2,3,4, and 6.

In specific reference to FIG. 1, a computer calculator 10 is shown in FIG. 1. On the face 11 of the calculator 10 are buttons 12A, 12B, 12C, 12D, 12E, 12F, 12G, 12H, 12I, and 12J representing control buttons for decimal number inputs for the basic decimal numerals 1,2,3 4,5,6,7,8,9, and 0 respectively, as shown on the drawing. Push buttons 12A, 12B . . . 12J can be depressed individually in an arbitrary series fashion in order to provide the decimal number input into the computer 10 to consumate the desired conversion into metric and vice versa, as hereinafter described and detailed. This numerical input control button arrangement as described is of generally conventional arrangement.

An on-off switch 14 is provided to activate the computer 10 to the on or off position as the case may be. To the immediate right of the on-off switch 14, as seen in FIG. 1, is a selector switch 16, which functions to switch the circuits of computer 10 back and forth between specific conversion and calculation capabilities. More specifically, switch 16 is a linear movement, three place switch, which functions to select either a metric to English conversion capability, position 16A, or an English to metric conversion capability 16B, or alternately a simple arithmetic conversion capability, position 16C. Located to the immediate left of the on-off switch 14 is a rotatable selector switch 17 with multiple contact points around its periphery. Each contact point on switch 18 corresponds to a particular conversion media. For instance, as shown in the drawings, contact point 18A corresponds for temperature conversion capability; while contact points 18B is for linear conversion capability in the feet and meters conversion model. Other contact points can be so similarly constituted, in order to cover the various conversion factors in areas of weight, distance, temperature, volume, and so forth. These respective settings 18A, 18B, 18C . . . 18L for switch 17 can be set respectively for a desired conversion mode, at a given instance, and the advantage is that the user can ascertain and readily know what conversion media he is employing at a given time. As stated, specific conversion features for the remainder selector settings 18E, 18F, 18G, 18H, and 18I can be programmed so as to provide a range of conversion features, as the user may desire. A key 19 imprinted on the front face 11 of the computer 10, will provide a visual reference for the user in order to readily ascertain the conversion references for a given setting 18A, 18B . . . 18L.

Located on the top and bottom of the face of the computer face are visual panels 20A and 20B respectively. Visual display panel 20A is directed to provide visual readout figures for output data, while visual display panel 20B functions to display input readout figures for input data. By such a dual display system, the computer system is adapted to visually display the input and output data simultaneously. Thus for instance, should the user of the computer impress English numerical data into the system to achieve a resultant metric readout, the input panel 20B would yield a visual reading of the English numerical input data, while the upper panel will subsequently, upon completion of the conversion calculation, yield the figures for metric result desired.

In addition, located on the computer face 11 is a control button 30 which serves to activate the computer circuitry for a given calculation. Control button 32, arbitrarily designated R is equipped to clear all circuits after a given calculation. Buttons 34A, 34B, 34C, and 34D are provided to hold data input units temporarily for further calculator functions. Ordinary arithmetic computational functions, namely adding, substracting, dividing and multiplying are provided for in the subject computer and control buttons 36A, 36B, 36C, and 36D respectively are constructed for this function. Push button 30 serves as the computer operate button, that is button 30 is pressed at the end of each input to signal commencement of a calculation. The control and electrical systems for these latter four basic functions are merely auxiliary to the metric conversion system hereinafter set forth and are not considered a unique feature as to these elements. Therefore, no description will be given to any specific attribute to the mathematical computation systems, it being understood that these are conventional systems.

As can readily be determined from the foregoing description, the control circuits operate in a straight forward fashion. First, the user manipulates switch 14 from the "on" to "off" position. Secondly, switch 16 is manipulated to one of the two conversion modes, 16A and 16B,, i.e. from English to metric or from metric to English. Alternately, it can be set at the arithmetic position 16C. Next, the operator, moves rotary switch 17 to the appropriate Mode 18A 18B . . . 18L position to correspond to the physical area for which conversion is desired. Once the switch 17 is directed to the intended mode 18A, 18B . . . or 18L, the various control buttons 12A, 12B . . . 12J are impressed in series order, said order corresponding directly to the decimal number for either the metric or English input. Once the input number is impressed as stated, the control button 30 is impressed to commence the conversion calculation procedure. Upon completion of the calculation process, the resultant output data is shown on panel 20A. Once the conversion calculation is thusly completed, the circuits are cleared for future calculations by pressing button 32. Hold buttons 34A, 34B, 34C and 34D can be used for various holding functions in the event, data is to be held for successive conversions.

As stated above, the computer 10 serves to process the basic arithmetic functions of addition, substraction, multiplication and division as an auxiliary or supplementary function. Thus, whenever, the arithmetic functions are sought to be employed, the control button 16 is switched to the "A" position, as opposed to the two respective conversion positions 16A and 16B of "ME" for metric to English, and "EM" for English to metric, respectively. The function switch at position "A" 16C thus serves to direct all electrical signals through a digital calculator unit 65, schematically shown in FIG. 2, which is conventionally structured and transistor equipped for processing data for the various basic functions indicated. Again, this latter function and unit is not novel.

Referring now more particularly to FIG. 2 and the flow diagram shown therein, the operational circuitry in the subject computer 10 is set forth therein, schematically showing the sequential arrangement between the respective functional units of the computer. Specifically, the block labeled keyboard 40 is the circuitry unit connected directly to the keyboard 11 control units described in detail hereinabove. The keyboard circuitry unit 40 leads in turn directly to the binary converter unit 45, as shown in FIG. 2. This converter unit 45 functions to convert the decimal number input signals to binary numbers. This functional transfer and the unit 45 therefor is standard, as it is almost essential for computer processing to use binary numbers.

Upon completion of the conversion from decimal to binary, the resultant binary number data signals are passed immediately into a storage unit 50, also of conventional construction. The storage unit 50 is preferably comprised of a series of flip-flop units, or other electronic means, which serve to temporarily or permanently store unit input signals from converter unit 45. Signals from storage unit 50 pass to one of two independent units depending on the desired functional processing of the input data. In particular, whenever switch 16 is moved to the position 16C for arithmetic computations, all signals from storage unit 50 will pass directly to digital calculator unit 65, bypassing as a consequence the metric conversion circuitry, described immediately hereinbelow. Under such latter circumstances, the computer 10 functions solely to perform the designated arithmetic functions. When the arithmetic functional area is being used, the metric conversion circuits are completely bypassed, as represented in FIG. 2.

When the function switch 16 is moved to either position 16A or 16B, the arithmetic circuit through calculator 65 is bypassed, and all signals are directed through a converter unit 55, which serves to convert all digital signals to an analog basis, since the subject computer utilizes an analog system for the metric computational conversion process. More specifically, unit 55 is a conventional digital to analog converter unit. This latter unit 55 serves to convert the digital signals to an analog basis for ultimate precise measurement of electric energy (voltage or current) levels. The digital to analog converter 55 in the preferred embodiment of the subject invention preferably employs standardized level amplifiers in conjunction with the summing effect of resistor ladder networks, the latter being coupled to an operational amplifier controlled by a transistor and connected flip-flops. All the foregoing circuitry is conventional as in the case of the storage units and decimal to binary converters. However, it is to be noted that the foregoing described circuitry for converting digital signals to analog signals is only one electronic arrangement of several that could be utilized for this conversion process.

The subject computer is partially an analog computer and partially a digital computer, that is, it is a hybrid computer incorporating elements of both the analog type and the digital type computer. The digital component is the input system, described above, while the analog system comprises the computational network. The output portion can be transformed back to a digital basis. As a consequence of the foregoing arrangement there is a need for two conversion systems. The first conversion device 55 is used to change signals from digital to analog so that the computation unit 60 can operate on discrete voltage levels in an analog computational basis.

A second converter 70 follows the computational unit 60, and this converter serves to convert output signals from calculator 60 back to digital from an analog basis. Then the binary signals from converter 70 are then transferred or converted to a decimal basis in converter unit 75. Finally, all signals are diverted to a driver display output unit 80 which functions to display to generate the input and output data on display windows 20A and 20B.

In FIG. 2, it is to be noted that circuit 42 from keyboad 40 bypasses all the foregoing conversion and computational circuitry. This circuit 42 leads to an input data storage unit 43, and thence by way of circuit 44. All input signals are directed to the driver display 80 so that input data can be displayed immediately in window 20B.

In the input system leading to the analog calculating unit 60, there is a read-in pulse circuit line which extends from the decimal to binary converter 45 and the circuit line is provided to feed signals into the storage unit 50 in parallel form. Read-in pulse circuit, not shown, obtains its input, as stated above, from the output by way of a pulse generator of the decimal to binary conversion unit 45. For this purpose, the storage unit 50 is comprised of flip flop units, not represented, which are energized to "0" or "1" levels by the signal of the read in pulse through the pulse circuit, also now shown. In particular, the pulse signals will pass to one of four "and" gates, which gates exist respectively for the $2^0$, $2^1$, $2^2$, and $2^3$ binary levels. Additionally, a complementary "and" gate exists for each such latter binary level.

The output of the storage unit is directed through a series of four level amplifiers, not specifically set forth, which serve to ensure that a "0" output is zero voltage while, on the other hand, a "1" output is exact voltage level set for relative unitary purposes, specifically one volt. After this indicated amplification process, the outputs of the level amplifiers are summed, in the digital to analog converter 55, in a resistor ladder network, not shown, which is in turn coupled to a high input resistance type amplifier, and the operational characteristics of this latter amplifier are dependent functionally on a conjoined feedback resistor.

By use of a four bit ladder in the foregoing described ladder network, an input voltage level, for instance 15 volts, can be divided by 15, yielding 16 distinct voltage levels, including the "0" level as level one. Thus, analog out from converter 55 can be 1,2,3,4,5,6,7,8,9,10,11,12,13,14 and 15 volts. It is these discrete voltage levels which serve as the variable input factors into the analog conversion unit 60, more fully described hereinbelow.

The computing unit 60, as indicated above, for the subject invention is an analog device, as the preferred embodiment. However, it must be noted that a digital computer system using integrated transistor circuits may also be feasible in certain circumstances. This invention, however, is preferably based on an analog conversion unit. Moreover, the operational characteristic in the subject analog device is based on the use of various resistors, each having linear functional values such that current through a respective unit changes in proportion to the voltage across it and by such process accurate multiplication can be achieved. Since metric conversion processes entail multiplication processes, using resistors of predetermined fixed values in the analog unit 60, serves to provide multiplication by a constant, in a given instance or mode of conversion.

More specifically, a voltage multiplier, as used in the subject device, and as shown in FIGS. 3,4 and 6, performs multiplication processes, with multiplication by a constant ratio, given a resistor of a predetermined fixed value. Referring, particularly to FIG. 6, a circuit is shown for conversion capability from meters to yards. This circuit, as shown, will multiply a voltage value by a factor of 109.3, which is the fixed conversion ratio to convert meters to yards. Thus, whenever a decimal value for a measurement in meters is impressed in the system at keyboard 40, the corresponding electrical signal passing through converter 45, storage 50, and the digital to analog converter 55 will have a correspondingly proportional voltage value. This corresponding voltage signal emanating from converter 55 will serve as the input signal for analog calculator unit 60. As shown in FIG. 6, this voltage input signal from unit 55 calculator unit 60 will be $E_1$ entering the circuit at junction 82, as shown. As stated, at junction 82 will be a voltage level which will be directly proportional to the input value for the given calculation, and $E_0$ at junction 98 will be the output.

More particularly, at junction 82 the input is a voltage level measured in binary units of the voltage of the metric reading. This voltage input $E_1$ is taken from the output junction of the converter unit 55, and this voltage input is $E_1$, which voltage input traverses circuit 88 through resistor 85 of 100K OHMS, purposely of even value. The voltage drop over resistor 86 causes voltage $E_1$ to drop in value, however, in view of the exact strength of 100K OHMS for resistor 86, voltage $E_1$ maintains a reading of its original value, but reduced to one one-hundred of its value, as it passes to junction 86. At junction 86 the current with voltage $E_1/100$ value passes through to parallel circuits 87 and 88, with the current in circuit 88 passing through resistor 90, as shown. Circuit 87 is equipped with a rectifier diode 89, as indicated. Resistor 90 in circuit 88 has an indicated resistance value of 109.3K OHMS. Thus the output at junction 91 is negative or minus 109.3/100.0 the value of $E_1$. The polarity of the resultant voltage at junction 91 is reversed as it passes through the remainder of the circuit, specifically through circuit 92, resistor 93 of 100K OHM value, and thence to junction 94, and finally through a multiplying circuit 95 with resistor 96 of the 100K OHM value. Thus, the output $E_0$ at junction 98 will be positive or +109.3/100 of $E_1$ and junction 82. This circuit in FIG. 6 thus serves as a converter of metric linear measurement, i.e. meters to yards, and the voltage output $E_0$ at junction 98 will be the corresponding value in yards.

The specific resistor 90 shown in FIG. 6 is measured at 109.3K OHMS and as stated is used to convert meters to yards, since 1.093 is the constant of multiplication to convert meters to yards. Thus any time the input voltage $E_1$ is provided for a given metric level, the output at junction 98 will be the comparable yard level. Now, however, it is desirable, as stated above, to use the subject computer invention for multiple conversion purposes, either from metric to English, or vice versa from English to metric, as the case may be, but in various areas, e.g. weight, etc. It is therefore necessary to utilize different valued (strength) resistors in place of resistor 90 in the circuit shown in FIG. 6 for each conversion mode, since each conversion mode requires a different multiplication constant. A simple but cumbersome method would be to provide approximately two dozen circuits like the one shown in FIG. 6, each similar to the particular circuit shown in FIG. 6. The only difference between all such circuits would be the value of resistor 90 in each such circuit. In order to eliminate this duplication of circuits, a rotor unit 130 as shown in FIGS. 3 and 4 is used, wherein such rotor mainly comprises a plurality of linearly disposed resistors spaced evenly in parallel fashion around the ends 132 of rotor drum 130 as illustrated in the drawings. The rotor is thus specifically comprised of eleven linear resistors 140A, 140B . . . 140L as shown. These individual resistors 140A, 140B . . . 140L are constructed similarly to one another as shown, with the only difference being that each resistor has a different resistance value, depending on the conversion function it is to serve. Specifically, resistor 142A is valued at 1.093K OHMS since it is used to convert meters to yards, and functions as described above. Similarly, each subsequent resistor 140B . . . 140L is so specifically valued so as to correspond to a specific conversion ratio for a specific metric to English conversion mode or an English to metric conversion mode.

Drum 130 is structured to rotate about rotor axis 144 shown in FIGS. 3 and 4. The circuit in FIG. 4 is identical to FIG. 6 except for resistor 90 being replaced with drum 130. Rotor axis 144 is moved by manual movements of switch 17, being directly connected therewith. The location and placement of rotor drum 130 in circuit 88, is diagrammatically and schematically shown in FIGS. 3 and 4, as being offset its radius distance from circuit 88. Each resistor 140A, 140B . . . 140L has an engaging contact clip on each end thereof, and these respective clips are designed to engage mating clips 148 and 149 on circuit 88 at the respective contact points of said circuit 88. More particularly, circuit 88 has snap clips 148 and 149 to engage the respective end clips on the individual resistors so as to engage the respective clips and complete a circuit between the opposite ends of circuit 88 through whichever specific resistor 140A, 140B . . . 140L is rotated at a given time in alignment with the circuit clips 148 and 149. Clips 148 and 149 on circuit 88 are only designed for a simipermanent engagement so that each resistor 140A, 140B . . . 140L can be easily moved in and out of engagement with the clips 148 and 140 of the circuit 88, as a situation dictates. By the aforesaid arrangement, the circuit 88 is variously channeled at any one time through any one of the resistors 140A, 140B . . . 140L of differing values. Each of these different values for the respective resistors 140A 140B . . . 140L will yield a correspondingly different voltage output level at the junctions 91 and 98 of circuit 88. It is this latter voltage level at junction 98 which is measured as the corresponding metric or English output, since the circuit shown in FIGS. 4 and 6 serve to multiply by a constant value. Thus, where the value in voltage level is directed through circuit 88, it will be multiplied by a constant value, a metric to English conversion factor or vice versa, corresponding to the specific value of the resistor in place at a given time.

FIG. 5 shows an altermate embodiment wherein the contact point 148 is complemented by a central hub contact 144, in lieu of opposing clip 149. In this latter embodiment each resistor has an inwardly directed component meeting at hub 144.

The foregoing description is of a preferred embodiment and is only one possible embodiment of several in the scope of the subject invention.

I claim:

1. A metric conversion computational system comprising:
   (a) a control unit with a face
   (b) a plurality of control switches to impress input data into the computer; said control switches being located in the face of the control unit;
   (c) switch means to switch electrical circuitry from arithmetic to metric conversion system; said switch means being located on the face of the control unit;
   (d) a control switch on said control unit for changing the metric conversion computational system from one type of conversion media to another;
   (e) analog electrical means connected to said control switch, said analog electrical means comprising a rotatable member having discrete resistance values for each conversion area.

* * * * *